United States Patent
Suzuki et al.

(10) Patent No.: US 7,867,550 B2
(45) Date of Patent: Jan. 11, 2011

(54) FABRICATION PROCESSES FOR ELECTRODES FOR ELECTROCHEMICAL DEVICES, AND ELECTROCHEMICAL DEVICE FABRICATION PROCESS

(75) Inventors: Hisashi Suzuki, Tokyo (JP); Katsuo Naoi, Tokyo (JP)

(73) Assignee: TDK Corporation, Tokyo (JP)

( * ) Notice: Subject to any disclaimer, the term of this patent is extended or adjusted under 35 U.S.C. 154(b) by 639 days.

(21) Appl. No.: 11/488,156

(22) Filed: Jul. 18, 2006

(65) Prior Publication Data

US 2007/0048435 A1     Mar. 1, 2007

(30) Foreign Application Priority Data

Jul. 25, 2005   (JP) .............................. 2005-214203

(51) Int. Cl.
  *B05D 5/12*   (2006.01)
  *B05D 3/02*   (2006.01)
(52) U.S. Cl. ................. 427/58; 427/372.2; 427/532; 427/98.2; 29/623.5
(58) Field of Classification Search ............. 427/372.2; 29/623.5
  See application file for complete search history.

(56) References Cited

U.S. PATENT DOCUMENTS

| | | | | |
|---|---|---|---|---|
| 5,287,632 A | * | 2/1994 | Heit et al. ................ 34/341 |
| 6,217,623 B1 | * | 4/2001 | Reichert et al. ............ 29/623.5 |
| 6,306,754 B1 | * | 10/2001 | Agarwal ................... 438/619 |
| 2004/0014590 A1 | * | 1/2004 | Horhota et al. ............. 502/34 |
| 2004/0175958 A1 | * | 9/2004 | Lin et al. .................. 438/778 |

FOREIGN PATENT DOCUMENTS

| | | |
|---|---|---|
| JP | 2000-506669 | 5/2000 |
| JP | 2005-166756 | 6/2005 |
| WO | WO 97/34334 | 9/1997 |

OTHER PUBLICATIONS

U.S. Appl. No. 11/488,044, filed Jul. 18, 2006, Naoi, et al.

* cited by examiner

*Primary Examiner*—Shamim Ahmed
(74) *Attorney, Agent, or Firm*—Oblon, Spivak, McClelland, Maier & Neustadt, L.L.P.

(57) ABSTRACT

According to the present invention, when the electrode for electrochemical devices is fabricated, the treating method for removing off a binder solvent adsorbed to pores in an electrode-constituting activated charcoal or the like, using carbon dioxide in a supercritical state, is used or a method wherein the supercritical-state treating method is modified using a low-boiling solvent is used, whereby the electrostatic capacity of the carbonaceous material as the active substance and the reliability of the electro-chemical device can be improved.

20 Claims, 2 Drawing Sheets

FIG. 1

FABRICATION PROCESSES FOR ELECTRODES FOR ELECTROCHEMICAL DEVICES, AND ELECTROCHEMICAL DEVICE FABRICATION PROCESS

BACKGROUND OF THE INVENTION

1. Field of the Invention

The present invention relates to a fabrication process for electrodes used with electric double-layer capacitors (EDLCs), lithium ion secondary batteries, etc., and an electrochemical device fabrication process that involves part of that process.

2. Description of the Prior Art

Electrochemical devices such as electric double-layer capacitors (EDLCs) and lithium ion secondary batteries are now widely used for cell phones, PDAs (personal digital assistants), etc.

Electrodes for such electrochemical devices are fabricated by coating a collector (support carrier) such as an aluminum or copper foil with an electrode-formation coating material comprising an active substance, a binder, a binder soluble solvent or a solvent for imparting plasticity to an electrode, which is applied when an insoluble binder is used (these solvents are collectively called the "binder solvent"), and an optionally used conductive aid such as carbon black.

When polyvinylidene fluoride (PVDF) is used as the binder for the preparation of the electrode-formation coating material, N-methyl-2-pyrrolidinone (NMP) is usually used as the binder solvent.

In an electrode fabrication process by such coating film formation, the binder solvent remains in the electrode film in no small amounts. Especially with the fabrication of an electrochemical device with which activated charcoal having a large surface area is used as its active substance, there is a problem that the electrostatic capacity of the activated charcoal dwindles due to the adsorption of the binder solvent onto its surface. Also, the remaining binder solvent is responsible for drops of the durability and reliability of the electrochemical device.

To solve such problems, there have been various techniques proposed so far in the art, for instance, an electrochemical cell control method using a supercritical state carbon dioxide (Domestic Republication of PTC 2000-506669), a secondary battery fabrication process in which an electrode-formation material is washed with a supercritical state fluid before or after electrode formation (JP-A61-68870), and a fabrication process for activated charcoal for electric double-layer capacitors which involves treatment with water in a supercritical or near state (JP-A2004-31713).

However, the binder solvent used for the fabrication of an electrode for electrochemical devices such as electric double-layer capacitors (EDLCs) and lithium ion secondary batteries still remains in the electrode in no small amounts only by virtue of ordinary drying techniques.

Further, in activated charcoal or other porous carbon material used as the active substance, there are surface pores. The pores are broken down into macro-pores (of 50 nm or greater in diameter), meso-pores (of 2 to 50 nm in diameter), and micro-pores (2 nm or less in diameter).

The binder solvent used on electrode fabrication is difficult to remove, because of adsorption to such pores. In particular, it is very difficult to remove the solvent adsorbed to the micro-pores.

A certain solvent polymerizes upon heating. As that solvent is heated while adsorbed onto a pore, it causes the solvent to polymerize within the pore; solvent removal by heating may possibly clog up the pore with the polymer.

Thus, as the solvent is adsorbed to the surface pores of activated charcoal or the pores are clogged up with the polymer resulting from the solvent, electrolyte ions fail to have access to the surface of activated charcoal, offering a problem that the electrostatic capacity of activated charcoal dwindles.

With such considerations in mind, it is still desired to make further improvements in the above prior art techniques, thereby achieving a process for the fabrication of an electrode for electrochemical devices, which ensures that the electrostatic capacity of a carbonaceous material as an active substance is increased with much improvement in the reliability of an electrochemical device.

SUMMARY OF THE INVENTION

Such being the situation, the inventors have made study after study on a treating method for removal of a binder solvent adsorbed to pores in an activated charcoal or the like that forms an electrode for electrochemical devices by use of carbon dioxide in a supercritical state and a method that is a modification to this supercritical-state treating method, and found that by use of such methods, the electrostatic capacity of a carbonaceous material as an active substance can be increased, and the reliability of an electrochemical device can be improved. Those findings have underlain the present invention.

Thus, the present invention provides a process for fabricating an electrode for electrochemical devices, said electrode comprising an active substance and a binder on a support carrier, wherein said process comprises:

a coating material providing step of providing an electrode-formation coating material comprising said active substance, said binder and a binder solvent, a coating step of coating said coating material on said support carrier to form a coating film for said electrode, and a supercritical carbon dioxide ($CO_2$) treatment step of removing off a binder solvent remaining in said coating film, using carbon dioxide in a supercritical state.

The present invention also provides a process for fabricating an electrode for electrochemical devices, said electrode comprising an active substance and a binder on a support carrier, wherein said process comprises:

a coating material providing step of providing an electrode-formation coating material comprising said active substance, said binder and a binder solvent, a coating step of coating said coating material on said support carrier to form a coating film for said electrode, and a combined solvent deposition and supercritical carbon dioxide ($CO_2$) treatment step of treating said coating film with carbon dioxide in a supercritical state while a low-boiling solvent remains deposited to said coating film, thereby removing off a binder solvent remaining in said coating film.

In a preferable embodiment of the present invention, said combined solvent deposition and supercritical carbon dioxide ($CO_2$) treatment step is such that to create a state where said low-boiling solvent remains deposited to said coating film, once said coating film has been dipped in said low-boiling solvent, said coating film is lifted up therefrom, after which said coating film is treated with carbon dioxide in a supercritical state.

Further, the present invention provides a process for fabricating an electrode for electrochemical devices, said electrode comprising an active substance and a binder on a support carrier, wherein said process comprises:

a coating material providing step of providing an electrode-formation coating material comprising said active substance, said binder and a binder solvent, a coating step of coating said coating material on said support carrier to form a coating film for said electrode, and a combined solvent dipping and supercritical carbon dioxide ($CO_2$) treatment step of treating said coating film with carbon dioxide in a supercritical state while said coating film remains dipped in a low-boiling solvent, thereby removing off a binder solvent remaining in said coating film.

In a preferable embodiment of the present invention, said low-boiling solvent is composed of a solvent that is compatible with said binder solvent, and has a boiling point lower than that of said binder solvent.

In a preferable embodiment of the present invention, said active substance is composed of a carbonaceous material having a specific surface area of 30 $m^2/g$ or greater.

In a preferable embodiment of the present invention, said carbonaceous material is composed of activated charcoal.

In a preferable embodiment of the present invention, said electrode for electrochemical devices is provided in the form of an electrode for electric double-layer capacitors, an electrode for lithium secondary batteries or an electrode for hybrid capacitors.

In the electrochemical device fabrication process of the present invention, an electrode is fabricated by any one of the above processes for fabricating an electrode for electrochemical devices, and at least the thus fabricated electrode, a separator, an electrolyte and a housing are assembled together into an electrochemical device.

According to the present invention, when the electrode for electrochemical devices is fabricated, the treating method for removing off a binder solvent adsorbed to pores in an electrode-constituting activated charcoal or the like, using carbon dioxide in a supercritical state, is used or a method wherein the supercritical-state treating method is modified using a low-boiling solvent is used, whereby the electrostatic capacity of the carbonaceous material as the active substance and the reliability of the electro-chemical device can be improved.

DETAILED EXPLANATION OF THE INVENTION

The best mode for carrying out the present invention is now explained at great length with reference to the accompanying drawings.

Prior to giving an explanation of the process for the fabrication of an electrode for electrochemical devices, and the process for the fabrication of an electrochemical device according to the present invention, the schematic structures of an electric double-layer capacitor (EDLC) and a lithium ion secondary battery—the preferable examples to be fabricated—are first explained with reference to FIGS. 1 and 2.

Explanation of the Schematic Structure of an Electric Double-Layer Capacitor (EDLC)

Figure 1:
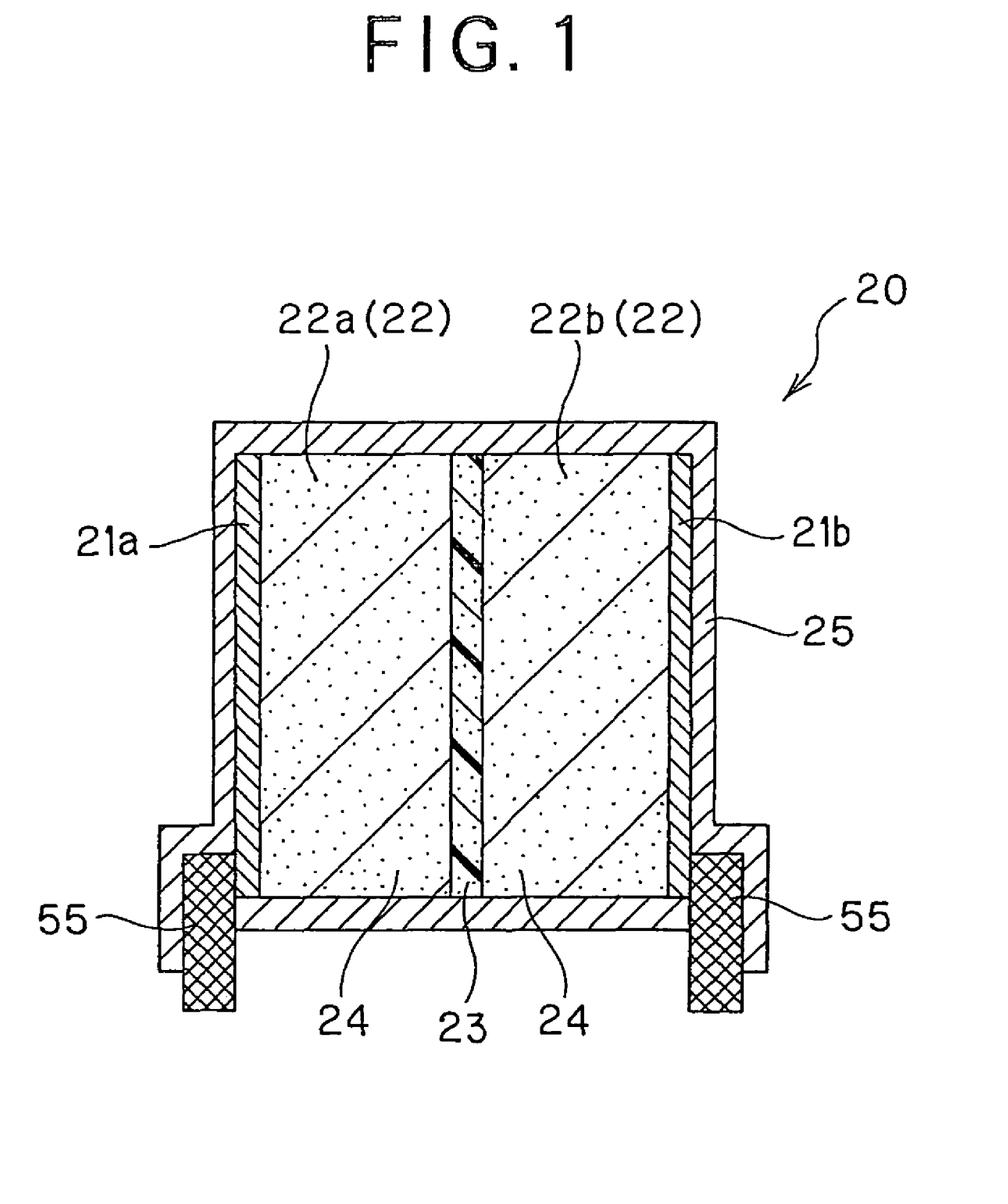
FIG. 1 is schematically illustrative in section of one preferred embodiment of an electric double-layer capacitor (EDLC)

FIG. 1 is schematically illustrative in section of an electric double-layer capacitor that is to be fabricated by the present invention.

As depicted in FIG. 1, an electric double-layer capacitor 20 (electrochemical device) includes an electrode pair 22 comprising a positive electrode 22a (the first electrode) and a negative electrode 22b (the second electrode) which are oppositely located.

The positive electrode 22a (the first electrode) and the negative electrode 22b (the second electrode), which form part of the electrode pair 22, are held in such a way as to be joined to a positive electrode collector 21a and a negative electrode collector 21b, respectively, each as a support carrier.

Such an electrode pair 22 is housed within a housing 25, and a separator 23 is located between both the electrodes 22a and 22b. And then, both the electrodes 22a and 22b and the separator 23 are impregnated therein with an electrolyte 24. Reference numeral 55 is indicative of projecting tabs that are connected to the ends of the positive electrode collector 21a and the negative electrode collector 21b, and act as external connector terminals. Each component is now explained in further details.

Collector

For the positive electrode collector 21a and the negative electrode collector 21b, each acting as a support carrier, there is no critical requirement but to be made up of a member having electrical conductivity. For instance, sheets of metals such as carbon steel, stainless steel, aluminum alloy or aluminum or a metal-plated polymer sheet may be used as the occasion may be.

Electrodes

The positive electrode 22a and the negative electrode 22b are each formed by coating of a coating material comprising an active substance and a binder with a conductive aid added thereto if required. For the reason of coating formation, the binder solvent remains in the electrodes slightly, if not in large amounts. Although it is ideal that the binder solvent does not remain in the electrodes at all, it is here acceptable that the binder solvent remains in an amount of 500 ppm or less, preferably 200 ppm or less, and more preferably 1 to 100 ppm.

For the active substance, for instance, use may be made of carbon materials (e.g., activated charcoal) obtained by activation of raw coals (e.g., petroleum cokes, etc. produced from delayed cokers using as starting oils bottom oils stemming from fluid cat-crackers for petroleum-base heavy oils or oil residues stemming from reduced pressure evaporators). The active substance used here should preferably be a carbonaceous material (especially activated charcoal) having a specific surface are of 30 $m^2/g$ or greater. The larger the specific surface area, the lesser the binder solvent adsorbed to the surface of the carbonaceous material is likely to come off; the advantage of the present invention of being capable of removing the hard-to-remove material is much more enhanced, and the electrostatic capacity of the resulting activated charcoal grows large as well.

For the conductive aid, carbon black, graphite or the like may be used.

For the binder, for instance, use may be made of polyvinylidene fluoride (PVDF), polytetrafluoroethylene (PTFE), polyethylene (PE), polypropylene (PP), and fluoro-rubber.

Separator

The separator 23, for instance, may be made up of a porous film formed of a material containing at least one of polyolefins (e.g., polyethylene and polypropylene) (two or more polyolefins include a laminate of two or more films), polyesters such as polyethylene terephthalate, thermoplastic fluororesins such as ethylene-tetrafluoroethylene copolymers, and celluloses.

When the separator 23 is applied in a sheet form, it is preferably the one formed of a micro-porous film, a woven fabric sheet or a non-woven sheet having an air permeability of about 5 to 2,000 sec./100 cc, as measured according to JIS-P8117, and a thickness of about 5 to 100 μm.

The separator 23 may have a shutdown function as well. This could hold back thermal runaway that might otherwise occur due to the clogging of pores in the separator 23 at a time when, for some unknown reasons, there are overcharges, internal short circuits or external short circuits in the electric double-layer capacitor 20, or there is a rapid rise in the battery temperature.

Housing

The housing 25 may be formed of a can-like member formed of, for instance, carbon steel, stainless steel, aluminum alloy or aluminum or, alternatively, it may be formed of a bag member comprising a metal foil/polymer film laminate (laminated film). The use of such a bag member helps achieve a low-profile, lightweight electric double-layer capacitor 20, and improve barrier capability with respect to outside air or moisture, ensuring sufficient prevention of degradation.

For the laminated film provided for the purpose of, e.g., making sure of insulation between the metal foil and a terminal leading to a power source, it is preferable to use a laminate obtained by laminating on both surfaces of an aluminum or other metal foil polyolefinic heat bondable polymer layers such as polypropylene or polyethylene layers, polyester-base heat resistant polymer layers, etc.

Electrolyte

For the electrolyte 24, for instance, an electrolyisis solution in which an electrolyte such as triethylmethylammonium borofluoride (TEMA.BF$_4$) or tetraethylammonium borofluoride (TEA.BF$_4$) is dissolved in a solvent or a polymer electrolyte may be used. It is also acceptable to use a solid state electrolyte.

The solvent for the electrolysis solution used here is preferably a non-aqueous solvent, or an aprotic polar organic solvent that does not break up even at a high operating voltage. Such solvents are exemplified by carbonates such as ethylene carbonate (EC), propylene carbonate (PC), butylene carbonate, dimethyl carbonate (DMC), diethyl carbonate (DEC) and ethyl methyl carbonate; cyclic ethers such as tetrahydrofuran (THF) and 2-methyltetrahydrofuran; cyclic ethers such as 1,3-dioxolane and 4-methyldioxolane; lactones such as γ-butyrolactone; sulfolanes such as 3-methylsulfolane; dimethoxyethane, diethoxyethane, ethoxymethoxyethane, and ethyldiglime.

Among others, preference is given to ethylene carbonate (EC), propylene carbonate (PC) and butylene carbonate, although propylene carbonate is particularly preferred.

If required, the electrolysis solution may include additives that are exemplified by vinylene carbonate, and a sulfur-containing organic compound.

The polymer electrolyte is exemplified by gelled polymer electrolytes, and intrinsic polymer electrolytes. The gelled polymer electrolyte here refers to an electrolyte in which a polymer is swollen by a non-aqueous electrolysis solution thereby holding the non-aqueous electrolysis solution in the polymer, and the intrinsic polymer electrolyte here refers to an electrolyte in which a lithium salt is dissolved in a polymer.

For such polymers, for instance, use may be made of polyacrylnitrile, polyethylene glycol, polyvinylidene fluoride (PVDF), polyvinyl pyrrolidone, copolymers of acrylates including tetraethylene glycol diacrylate, polyethylene oxide diacrylate and ethylene oxide and acrylates having polyfunctional groups, and copolymers of polyethylene oxide, polypropylene oxide, and vinylidene fluoride and hexafluoropropylene.

Explanation of the Schematic Structure of Lithium Secondary Battery

Figure 2:
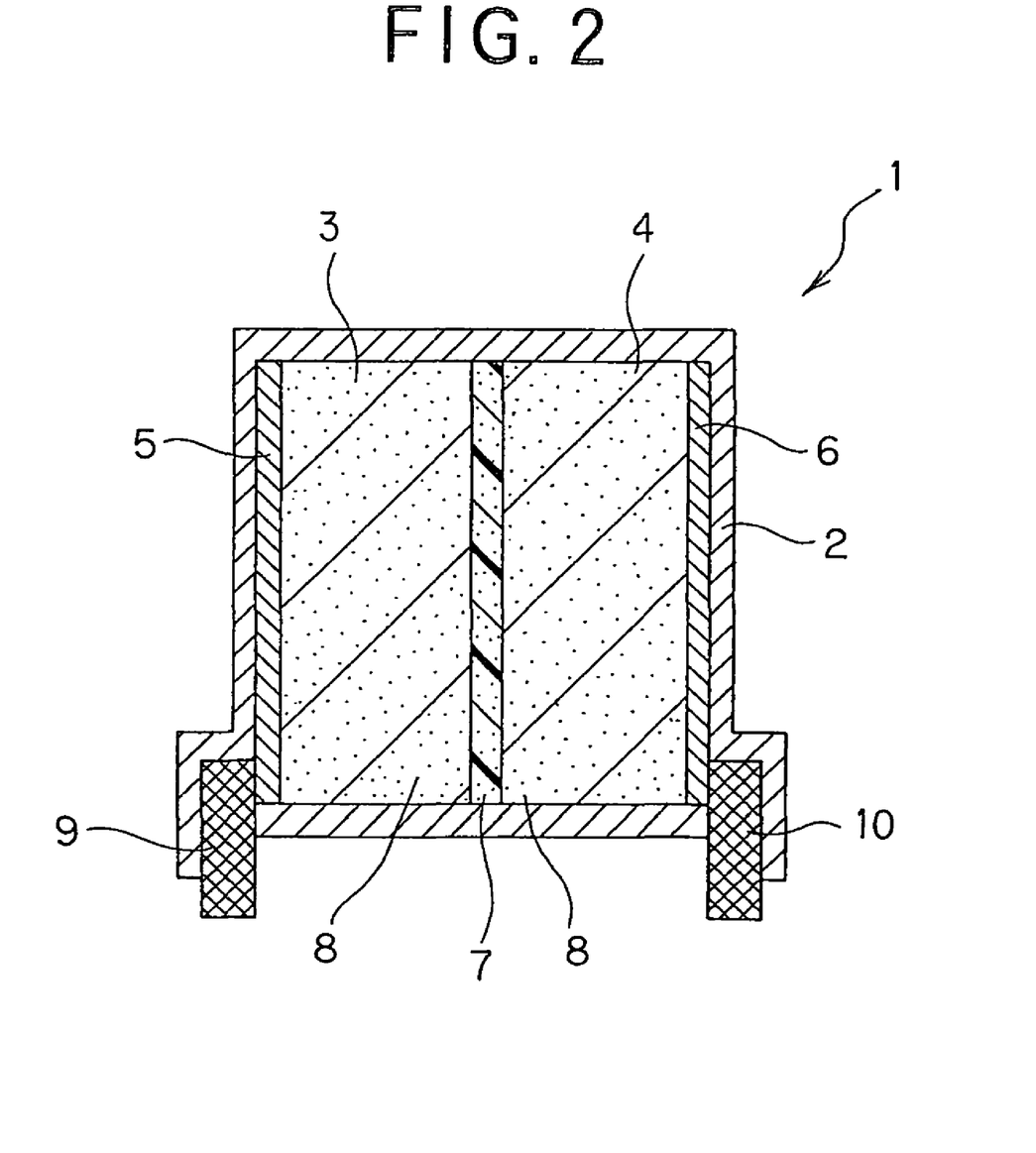
FIG. 2 is schematically illustrative in section of one preferred embodiment of a lithium ion secondary battery.

FIG. 2 is schematically illustrative in section of one preferred embodiment of the lithium secondary battery that is to be fabricated by the present invention.

A lithium ion secondary battery 1 comprises a positive electrode 3 formed on a positive electrode collector 5, a negative electrode 4 (electrode) formed on a negative electrode collector 6, and a separator 7 in a laminated or wound form. These components are housed together with an electrolyte 8 in a housing 2. Note here that the lithium ion secondary battery 1 may be of various battery forms such as a laminated or cylindrical battery form. Reference numerals 9 and 10 are indicative of projecting tabs that are joined to the ends of the positive electrode collector 5 and the negative electrode collector 6, and function as external connector terminals.

Positive Electrode & Negative Electrode

Both the positive 3 and the negative electrode 4 have a function of occluding and releasing lithium ions, and each comprises an electrode active substance (positive or negative electrode active substance) and a binder with a conductive aid added thereto if required.

The positive electrode active substance here is an active substance used for the positive electrode of a lithium ion secondary battery, and typical thereof is LiCoO$_2$. To the applicant's knowledge, a composite oxide containing Li, Mn, Ni, Co and O atoms is more preferable. When the so-called quaternary metal oxide containing four such main metal elements (or a lithium tertiary oxide: Li$_a$Mn$_b$Ni$_c$Co$_d$O$_e$) is used, it has preferably a substantially rock salt crystal structure.

The negative electrode active substance (in a sense of taking part in occlusion of lithium ions), for instance, includes manmade graphite, naturally occurring graphite, MCMB (meso-carbon microbeads), and a carbonaceous material obtained by firing of resins.

The amount of the electrode active substance to be loaded may be optionally determined in such a way as to be enough to allow the lithium ion secondary battery 1 to have practically sufficient energy densities and enough to be not inconveniently detrimental to battery performance, and the porosity of each of the positive electrode 3 and the negative electrode 4 may be optionally determined in such a way as to have a value at which a sufficient low-profile arrangement is achievable or lower, and a value at which the diffusion of lithium ions in each electrode 3, 4 is not unduly limited or greater. In other words, it is desired for the porosity of each electrode to be determined in consideration of a sensible tradeoff between the battery thickness demanded for thickness reduction and keeping battery performance high.

Although there is no particular requirement for the binder, it is desired to use thermoplastic polymers like fluorine-base polymers, polyolefins, styrene-base polymers and acrylic polymers or elastomers like fluororubbers. More specifically, polytetrafluoroethylene, polyvinylidene fluoride (PVDF), polyethylene, polyacrylonitrile, nitrile rubber, polybutadiene, butyrene rubber, polystyrene, styrene-butadiene rubber (SBR), polysulfide rubber, hydroxypropyl methyl cellulose, cyanoethyl cellulose, and carboxymethyl cellulose (CMC) are mentioned. These binders may be used alone or in admixture of two or more.

While there is no particular requirement for the conductive aid, it is preferable to use carbonaceous materials such as graphite, carbon black (acetylene black, etc.) and carbon fibers, and metals such as nickel, aluminum, copper and silver, among which the carbonaceous materials such as graphite, carbon black (acetylene black, etc.) and carbon fibers are more preferable in view of chemical stability. Most preferable is acetylene black because of very limited impurities.

Identical or different binders and conductive aids may be used for the positive electrode 3 and the negative electrode 4. Referring here to the electrode composition, the positive electrode 3 has preferably a positive electrode active substance: conductive agent:binder ratio in the range of 80-98:0.5-10:1-10 by mass, and the negative electrode 4 has preferably an active substance:conductive agent:binder ratio in the range of 80-98:0-5:1-15 by mass.

Further, the positive electrode 3 is integral with the positive electrode collector 5 acting as its support carrier while the negative electrode 4 is integral with the negative electrode collector 6 acting as its support carrier.

Collector

The material and configuration of the positive electrode collector 5, and the negative electrode collector 6 may be optionally selected depending on the polarities of the electrodes, in what form they are used, and how they are housed in the housing (casing); however, the positive electrode collector 5 is preferably formed of aluminum, and the negative electrode collector 6 is preferably formed of copper, stainless or nickel.

The support carriers, i.e., the positive electrode collector 5 and the negative electrode collector 6 are each preferably in a foil, mesh or other configuration. The foil or mesh configuration ensures that contact resistance can be kept low enough. In particular, it is more preferable to rely on the mesh configuration, because it ensures large surface areas and much lower contact resistance.

Separator

The separator 7, for instance, may be made up of a porous film formed of a material containing at least one of polyolefins (e.g., polyethylene and polypropylene) (two or more polyolefins include a laminate of two or more films), polyesters such as polyethylene terephthalate, thermoplastic fluorine-base polymers such as ethylene-tetrafluoroethylene copolymers, and celluloses. When the separator 7 is applied in a sheet form, it is preferably a sheet formed of a microporous film, a woven fabric sheet or a non-woven sheet having an air permeability of about 5 to 2,000 sec./100 cc, as measured according to JIS-P8117, and a thickness of about 5 to 100 μm.

The separator 7 may have a shutdown function as well. This could hold back thermal runaway that might otherwise occur due to the clogging of pores in the separator at a time when, for some unknown reasons, there are overcharges, internal short circuits or external short circuits in the lithium ion secondary batter, or there is a rapid rise in the battery temperature.

Housing

The housing 2 may be formed of a can-like member formed of, for instance, carbon steel, stainless steel, aluminum alloy or aluminum or, alternatively, it may be formed of a bag member comprising a metal foil/polymer film laminate (laminated film). The use of such a bag member helps achieve a low-profile, lightweight lithium ion secondary battery 1, and improve barrier capability with respect to outside air or moisture, ensuring sufficient prevention of degradation.

For the laminated film provided for the purpose of, e.g., making sure of insulation between the metal foil and a terminal leading to a power source, it is preferable to use a laminate obtained by laminating on both surfaces of an aluminum or other metal foil polyolefinic heat bondable polymer layers such as polypropylene or polyethylene layers, polyester-base heat resistant polymer layers, etc.

Electrolyte

The electrolyte 8 here is a lithium ion conductive substance and, to this end, an electrolysis solution in which a lithium salt is dissolved as an electrolyte salt or a polymer electrolyte is used. And of course, use may be made of a solid state electrolyte.

The solvent for the electrolyte used here is preferably a non-aqueous solvent that is poor in chemical reactivity to lithium and well compatible with a polymer solid electrolyte, an electrolyte salt or the like, and imparts ion conductivity to it, or an aprotic polar organic solvent that does not break up even at a high operating voltage. Such solvents are exemplified by carbonates such as ethylene carbonate (EC), propylene carbonate (PC), butylene carbonate, dimethyl carbonate (DMC), diethyl carbonate (DEC) and ethyl methyl carbonate; cyclic ethers such as tetrahydrofuran (THF) and 2-methyltetrahydrofuran; cyclic ethers such as 1,3-dioxolane and 4-methyldioxolane; lactones such as γ-butyrolactone; sulfolanes such as 3-methylsulfolane; dimethoxyethane, diethoxyethane, ethoxymethoxyethane, and ethyldiglime.

Among others, preference is given to ethylene carbonate (EC), propylene carbonate (PC) and butylene carbonate, although the cyclic carbonate such as ethylene carbonate (EC) is particularly preferred. Such cyclic carbonates have the properties of being higher in permittivity and viscosity than chain carbonates, so that the dissociation of the lithium salt that is the electrolyte salt contained in the electrolyte can be accelerated. In this respect, the cyclic carbonate is better fit for the electrolysis solution solvent for the lithium ion secondary battery 1.

However, as the cyclic carbonate accounts for too much of the solvent and the viscosity of the electrolysis solution grows too high, it often causes the migration of lithium ions in the electrolysis solution to be excessively held back, resulting in a sharp increase in the internal resistance of the battery. Preferably for the purpose of effective prevention of this, a chain carbonate lower in viscosity and permittivity than the cyclic carbonate is mixed with the solvent. As that chain carbonate accounts for too much of the electrolyte, conversely, it causes the permittivity of the solvent to become badly low, rendering the dissociation of the lithium salt in the electrolyte much less likely to proceed. In view of balances between these considerations, it is desired to determine the rate of the cyclic carbonate compound and the chain carbonate in the electrolysis solution.

The lithium salt (carrier salt) that provides a lithium ion supply source is exemplified by salts, for instance, $LiClO_4$, $LiPF_6$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used alone or in admixture of two or more. Among others, it is very preferable to use lithium phosphate hexafluoride ($LiPF_6$), because much higher ion conductivity is achievable.

Further, if required, additives may be added to the electrolysis solution. The additives, for instance, include vinyl carbonate, and a sulfur-containing organic compound. The addition of these to the electrolysis solution is very preferable, because of having effects on further improvements in the storability and cycle characteristics of the battery.

As the electrolyte is in a polymer electrolyte form rather than in an electrolysis solution state (form), it allows the lithium ion secondary battery 1 to function as a polymer secondary battery. The polymer electrolyte here is exemplified by gelled polymer electrolytes, and intrinsic polymer electrolytes. The gelled polymer electrolyte here refers to an electrolyte in which a polymer is swollen by a non-aqueous electrolysis solution thereby holding the non-aqueous electrolysis solution in the polymer, and the intrinsic polymer electrolyte here refers to an electrolyte in which a lithium salt is dissolved in a polymer.

For such polymers, for instance, use may be made of polyacrylnitrile, polyethylene glycol, polyvinylidene fluoride (PVDF), polyvinyl pyrrolidone, copolymers of acrylates including polytetraethylene glycol diacrylate, polyethylene oxide diacrylate and ethylene oxide and acrylates having polyfunctional groups, and copolymers of polyethylene oxide, polypropylene oxide or vinylidene fluoride and hexafluoropropylene.

There is also a hybrid type cell system (the so-called hybrid capacitor) thought of as an electrochemical device lying halfway between the lithium secondary battery and the electric double-layer capacitor, which cell system combines an electrostatic capacity that relies on an electric double layer and is capable of extracting large currents with a redox capacity that relies on an electrochemical oxidation-reduction reaction and is capable of ensuring high energy density. This is also the electrochemical device to be covered by the present invention. The hybrid capacitor here is preferably exemplified by the following embodiments.

(1) A hybrid capacitor comprising an electric double-layer capacitor as one electrode and a lithium ion secondary battery as another electrode wherein, for instance, its positive electrode comprises activated charcoal as a main component and its negative electrode comprises graphite as a main component; and (2) A hybrid capacitor comprising a combined electric double-layer capacitor and lithium ion secondary battery composite as one electrode and a combined electric double-layer capacitor and lithium ion secondary battery composite as another electrode wherein, for instance, each electrode comprises activated charcoal plus active substance as a main component.

Explanation of the Inventive Fabrication Process for Electrodes for Electrochemical Devices The inventive fabrication process for electrodes for electrochemical devices (the preferable one is the electrode for the above electric double-layer capacitor 20) is now explained.

The inventive fabrication process for electrodes for electrochemical devices, for instance, involves (1) a coating material provision step of providing an electrode-formation coating material, (2) a coating step of coating the coating material on a support carrier to form a coating film, (3) a first drying step of drying the coating film, (4) a rolling step of rolling the coating film, (5) a step of treating the coating film with supercritical carbon dioxide to remove off a binder solvent remaining in the coating film (optionally with the use of a low-boiling solvent), and (6) a second drying step. Among others, part of the present invention is constituted by the above steps (1), (2) and (5), of which the step (5) is imperative.

The fabrication process of the present invention is now explained step by step.

(1) Coating Material Provision Step of Providing the Electrode-Formation Coating Material The electrode-formation coating material comprising the active substance, conductive aid, binder and binder solvent is provided. One specific example is given just below.

The binder dissolved in the binder solvent, the active substance and the conductive aid are kneaded together under given conditions in a kneading machine. Thereafter, a given amount of the mixture is charged in a container, in which it is added with the binder solvent in such a way as to have a viscosity well fit for coating. Then, the product is dispersed in a dispersing machine to prepare the desired electrode-formation coating material. For mixing and dispersing operation, mixing/dispersing machines such as hyper mixers, dissolvers, Henschel mixers, planetary mixers, media type mills, and homo mixers may be used alone or in combination of two or more.

It is here noted that the electrode-formation coating material are composed of, per 100 parts by mass of the binder, about 500 to 10,000 parts by mass of the active substance, about 0 to 1,000 parts by mass of the conductive aid, and about 800 to 25,000 parts by mass of the binder solvent.

In the present invention, it is also noted that, as described above, the larger the specific surface area (e.g., 30 $m^3/g$ or greater) of the active substance used, the more striking the effect of the present invention becomes.

(2) Coating Step of Coating the Coating Material on the Support Carrier to Form the Coating Film A support carrier that functions as a collector and is of electric conductivity is provided. Then, the electrode-formation coating material prepared in step (1) is coated on the support carrier as by a doctor blade technique. Other coating techniques such as metal mask printing, dip coating, spray coating, roll coating, and screen printing may be used, too. A coating thickness at the time of coating may be of the order 5 to 300 μm.

(3) First Drying Step of Drying the Coating Film

Preferably, the first coating film-drying step is carried out to control the amount of the binder solvent contained in the coating film formed in coating step (2) to within the range of 10 to 45 wt %, and desirously 15 to 40 wt %. At less than 10 wt %, the electrostatic capacity will often drop under the action of the next rolling step. At greater than 45 wt %, the coating film will have tackiness way too high for convenient handling, often bringing on poor productivity and poor product quality.

The drying conditions here, for instance, are such that the above amount of the solvent remaining in the coating film is obtainable at a drying temperature of 80 to 150° C. for a drying time of 1 minute to 30 minutes.

(4) Rolling Step of Rolling the Coating Film

Preferably, the rolling step is carried out such that the coating film subjected to the given drying in the above first coating film-drying step is rolled as by a heated reduction roll. Alternatively, a plate press or calender roll or the like may be used. This rolling step ensures an improvement in the density of the coating film. The coating film has a density of the order of 0.55 to 0.75 $g/cm^3$, and preferably 0.60 to 0.70 $g/cm^3$.

In the rolling step, a pressure of the order of 200 kgf/cm to 2,000 kgf/cm is applied. The rolling step may be implemented either at room temperature, or in a heated state where rolling is feasible at a pressure lower than applied at room temperature. In the heated state, the pressurizing roll is desirously heated to about 60 to 200° C.

By this rolling operation, the coating film thickness is reduced down to, for instance, about 70 to 90%.

(5) Step of Treating the Coating Film with Supercritical Carbon Dioxide to Remove the Binder Solvent Remaining in the Coating Film After the rolling operation step, the coating film is treated with supercritical carbon dioxide to remove off the binder solvent remaining in the coating film. This supercritical carbon dioxide treatment step is carried out without or with the use of a low-boiling solvent. In the former case, (A) the supercritical carbon dioxide ($CO_2$) treatment step is simply applied to remove off the binder solvent remaining in the coating film by means of carbon dioxide in a supercritical state. In the latter case, there is (B) a combined solvent deposition and supercritical carbon dioxide ($CO_2$) treatment step wherein while the low-boiling solvent remains deposited onto the coating film, the coating film is treated with carbon dioxide in a supercritical state thereby removing off the binder solvent remaining in the coating film, or (C) a combined solvent dipping and supercritical carbon dioxide ($CO_2$) treatment step wherein while the coating film remains dipped in the low-boiling solvent, the coating film is treated with carbon dioxide in a supercritical state thereby removing off the binder solvent remaining in the coating film.

Regarding the Above (A):

To reduce the binder solvent in the electrode (the coating film), there is operation carried out for extracting the binder solvent from within the electrode (the coating film) with carbon dioxide in a supercritical state. The supercritical states here refers to a state that is beyond the critical temperature or critical pressure. As 31.1° C. (the critical temperature) and 73.8 atm (the critical pressure) are exceeded, carbon dioxide is passed into the supercritical state. A substance in the supercritical state is called a supercritical fluid that, albeit having a density close to that of a liquid (carbon dioxide has a critical density of 0.46 g/cm$^3$ at the above critical temperature and pressure), has a viscosity close to that of a gas and a diffusion power nearly 100 times as high as that of a liquid. Thus, supercritical carbon dioxide would penetrate through even activated charcoal pores (micropores of a few nm in diameter), getting rid of the substance adsorbed to there. In addition, there is another effect that once carbon dioxide—a gas at normal temperature and pressure—is released from the supercritical state, it then diffuses quickly, less likely to remain in the electrode. Furthermore, because the water in the electrode is concurrently removed off too, any drying operation after the treatment in the supercritical state may be dispensed of.

Regarding the Above (B):

In the combined solvent deposition and supercritical carbon dioxide ($CO_2$) treatment step, the coating film is treated in the supercritical state while the low-boiling solvent remains deposited onto the coating film. Preferable techniques for allowing the low-boiling solvent to remain deposited onto the coating film includes a technique wherein once the coating film has been dipped in the low-boiling solvent, it is lifted up from there, and a technique of spraying the low-boiling solvent onto the coating film. Afterward, the coating film is treated with carbon dioxide in the supercritical state.

If, at the time of treatment with carbon dioxide in the supercritical state, the low-boiling solvent is beforehand deposited onto the coating solvent, the effect on removal of the binder solvent is then much more enhanced, so that the electrostatic capacity of the carbonaceous material as the active substance can be much more increased, and the reliability of the electrochemical device can be much more improved.

Regarding the Above (C):

In the combined solvent dipping and supercritical carbon dioxide ($CO_2$) treatment step, the coating film is treated with carbon dioxide in the supercritical state while it is dipped in the low-boiling solvent. More specifically, the electrode and the low-boiling solvent are charged in an extractor of a supercritical system (in that extractor, the supercritical state is created) (the low-boiling solvent is used in an amount enough to permit the electrode to be dipped just full), and then placed in the supercritical state.

If, at the time of treatment with carbon dioxide in the supercritical state, the coating film is dipped in the low-boiling solvent, the effect on removal of the binder solvent is then much more enhanced, so that the electrostatic capacity of the carbonaceous material as the active substance can be much more increased, and the reliability of the electrochemical device can be much more improved.

The low-boiling solvent used with the above techniques (B) and (C) is compatible with the binder solvent, and has a boiling point lower than that of the binder solvent. The "low-boiling solvent" here is understood to mean a solvent having a boiling point of the order of 30° C. to 180° C.

For instance, when N-methyl-2-pyrrolidinone (NMP) is used as the binder solvent, organic solvent such as acetone, methylene chloride, and alcohol is preferably used as the low-boiling solvent. For instance, when the binder solvent is changed in association with the change of the binder used, a solvent that is compatible with the binder solvent and has a boiling point lower than that of the binder solvent may be optionally chosen. Each of those operations successfully gets rid of the high-boiling binder solvent adsorbed into the activated charcoal pores (micropores) thereby removing off it.

In the present invention, the operation of the supercritical carbon dioxide treatment (without or with the use of the low-boiling solvent) for removal of the binder solvent residues may be carried out either before or after the rolling operation for increasing the density of the coating film is carried out.

(6) Second Drying Step

After the above supercritical carbon dioxide treatment (without or with the use of the low-boiling solvent), the second drying step may be carried out to dry the coating film. By the second drying treatment that is ordinarily a vacuum drying operation, the water, low-boiling solvent, etc. remaining in the coating film are removed off. The drying temperature may be of the order of 80° C. to 300° C., and the drying time may be of the order of 30 minutes to 24 hours.

The sheet blank formed through such process steps, for instance, is punched out in a given shape. In this way, the inventive electrodes for electrochemical devices are fabricated.

Next, if the electrodes for electrochemical devices fabricated by such an inventive fabrication process, separators, electrolytes, housings, etc. are assembled together such that they function as an electrochemical device, it is then possible to fabricate an electrochemical device. The thus assembled electrochemical device, for instance, has the form of such an electric double-layer capacitor and lithium secondary battery as depicted in FIGS. 1 and 2.

The present invention is now explained more specifically with reference to some specific examples.

EXAMPLE 1

Step of Providing (Preparing) the Electrode-Formation Coating Material

A 5 wt % polyvinylidene fluoride (PVDF) solution with N-methy-2-pyrrolidinone (NMP) used as a solvent (KF7305 made by Kureha Chemical Industries Co., Ltd.), carbon black (DAB50 made by Denki Chemical Industries Co., Ltd.) and activated charcoal (RP-20 made by Kurare Chemical Industries Co., Ltd.) were kneaded together at 60 rpm for 1 hour in a kneading machine (PLASTI-CORDER made by Brabender Co., Ltd.).

A given amount of the mixture was charged in a resin container, in which it was added with the solvent (NMP) in such a way as to have a viscosity well fit for coating, and the mixture was dispersed in a dispersing machine (Hybrid Mixer made by Keyence Co., Ltd.).

The thus provided electrode-formation coating material was used to prepare an electrode by the following steps.

Preparation of the Electrode

An etching aluminum foil (40C054 made by Nippon Tikudenki Industries Co., Ltd.) was provided as a collector, and the electrode-formation coating material prepared as mentioned above was coated on that foil by a doctor blade technique.

Thereafter, the coating material was dried at 90° C. for 5 minutes and then at 105° C. for 5 minutes. The amount of the solvent residues in the coating film was 35 wt %. Thus, the first drying step was over. The then coating film thickness was about 130 μm.

Then, the electrode was rolled with a heated reduction roll four times at room temperature and a pressure of 600 kgf/cm. By this rolling operation, the coating film thickness was reduced down to about 85%.

Then, for removal of the N-methyl-2-pyrrolidinone (NMP) solvent and water remaining in the electrode, the supercritical carbon dioxide treatment was carried out in the following manner.

The supercritical system here was the one made by Mitsubishi Kakoki Co., Ltd. The treatment was carried out at 40° C. and 30 MPa for 2 hours.

The electrode was prepared in this way. The amount of NMP remaining in the electrode (coating film) was 330 ppm, as set out in Table 1.

The thus prepared electrode was used to fabricate an electric double-layer capacitor in the following manner.

Fabrication of the Electric Double-Layer Capacitor

The above electrode was punched out into a size of about 17 mm×32 mm, followed by ultrasonic welding of external leading tabs formed of an aluminum foil (of 4 mm in width, 40 mm in length and 0.1 mm in thickness).

Two such electrodes were stacked together with a separator (of 30 μm in thickness, Model TF4030 made by Nippon Kodoshi Industries Co., Ltd.) interposed between them.

The thus formed assembly was inserted into a battery housing, an electrolysis solution was then poured in the housing, and an opening of the housing was finally vacuum heat sealed into an electric double-layer capacitor. Note here that the housing used was composed of a laminated aluminum/polymer material specifically comprising PET(12)/Al(40)/PP (50), wherein PET, Al and PP are indicative of polyethylene terephthalate, aluminum and polypropylene, respectively, and the bracketed figure is indicative of thickness in μm. The housing was formed with PP located inside.

For the above electrolysis solution, a suitable amount of 1.2 M propylene carbonate with triethylmethyl-ammonium borofluoride ($TEMA.FB_4$) dissolved in it was used.

The thus fabricated electric double-layer capacitor sample was measured for (1) an electrostatic capacity per volume of electrode and (2) initial charge/discharge efficiency in the following manners.

(1) Electrostatic Capacity per Volume of Electrode ($F/cm^3$)

An electric double-layer capacitor was charged and discharged between 2.0 V and 2.5 V. Note that because the post-fabrication voltage was 0 V, only the first charge was started from 0 V.

Charge/discharge was carried out at 0.83 mA to find an average electrostatic capacity from the first up to the $15^{th}$ cycle. On the basis of the average electrostatic capacity and the volume of the electrode, the electrostatic capacity ($F/cm^3$) per volume of electrode (exclusive of the collector) was calculated. On condition that the number of samples was N=3, the average value of the electrostatic capacities of these samples per volume of electrode was obtained.

(2) Initial Charge/Discharge Efficiency

Initial charge/discharge efficiency η was found from the following equation.

Initial Charge/Discharge Efficiency η=(Quantity of Electricity on Initial Discharge/Quantity of Electricity on Initial Charge)×100

The quantity of electricity on initial charge here is indicative of the quantity of electricity necessary for charge from the capacitor terminal voltage 0 V (0 V at the time of fabrication of the capacitor) up to 2.5 V, and the quantity of electricity on initial discharge here is indicative of the amount of electricity necessary for discharge from the capacitor terminal voltage 2.5 V down to 2.0 V. The maximum value of the initial charge/discharge efficiency η is 20% on condition that the voltage change per unit time is constant.

The results of measurement for check points (1) and (2) are set out in Table 1, from which the electrostatic capacity of each electrode per volume and the initial charge/discharge efficiency η are found to be 18.7 ($F/cm^3$) and 18.4%, respectively.

Note that the amount of NMP remaining in the electrode (the coating film), as set out in Table 1, was measured as follows.

In a dry room, the coating film was peeled off the collector by means of a knife, and then placed in dimethylformaldehyde (DMF) for extraction of PVDF and NMP in the coating film into DMF. Then, methanol was added to the solution for re-precipitation of PVDF. The supernatant liquid was collected from the solution for quantification of NMP by gas chromatography.

EXAMPLE 2

The supercritical carbon dioxide treatment carried out in Example 1 was modified as follows.

Acetone was sprayed onto the electrode after the rolling operation, just after which the supercritical carbon dioxide treatment was applied to it. Already at the time of the supercritical carbon dioxide treatment, acetone would have coexisted.

Otherwise, an electric double-layer capacitor sample of Example 2 was prepared in the same manner as was the case with the preparation of the electric double-layer capacitor of Example 1.

As can be seen from Table 1 given later, the amount of NMP remaining in the electrode (the coating film) was 130 ppm; the electrostatic capacity of each electrode per volume was 18.9 (F/cm$^3$); and the initial charge/discharge efficiency η was 19.1%.

EXAMPLE 3

The supercritical carbon dioxide treatment carried out in Example 1 was modified as follows.

The post-rolling electrode was dipped in acetone. Just after it was lifted up from the acetone, the supercritical carbon dioxide treatment was applied to it. Already at the time of the supercritical carbon dioxide treatment, acetone would have coexisted.

Otherwise, an electric double-layer capacitor sample of Example 3 was prepared in the same manner as in the preparation of the electric double-layer capacitor of Example 1.

As can be seen from Table 1 given later, the amount of NMP remaining in the electrode (the coating film) was 110 ppm; the electrostatic capacity of each electrode per volume was 19.1 (F/cm$^3$); and the initial charge/discharge efficiency η was 19.3%.

EXAMPLE 4

The supercritical carbon dioxide treatment carried out in Example 1 was modified as follows.

The supercritical carbon dioxide treatment was applied to the post-rolling electrode while dipped in acetone. More specifically, the electrode and acetone were placed in an extractor of a supercritical system (in which extractor the supercritical state was created). The acetone was placed in the extractor in an amount that allowed the electrode to be dipped just full (about 3.5 litters), and the supercritical state was created in it.

Otherwise, an electric double-layer capacitor sample of Example 4 was prepared in the same manner as in the preparation of the electric double-layer capacitor of Example 1.

As can be seen from Table 1 given later, the amount of NMP remaining in the electrode (the coating film) was 71 ppm; the electrostatic capacity of each electrode per volume was 20.2 (F/cm$^3$); and the initial charge/discharge efficiency η was 19.5%.

EXAMPLE 5

The supercritical carbon dioxide treatment carried out in Example 1 was modified as follows.

The post-rolling electrode was dipped in ethanol. Just after it was lifted up from the ethanol, the supercritical carbon dioxide treatment was applied to it. Already at the time of the supercritical carbon dioxide treatment, ethanol would have coexisted.

Otherwise, an electric double-layer capacitor sample of Example 5 was prepared in the same manner as in the preparation of the electric double-layer capacitor of Example 1.

As can be seen from Table 1 given later, the amount of NMP remaining in the electrode (the coating film) was 120 ppm; the electrostatic capacity of each electrode per volume was 19.0 (F/cm$^3$); and the initial charge/discharge efficiency η was 19.2%.

EXAMPLE 6

The supercritical carbon dioxide treatment carried out in Example 1 was modified as follows.

The supercritical carbon dioxide treatment was applied to the post rolling electrode while dipped in ethanol. More specifically, the electrode and ethanol were placed in an extractor of a supercritical system (in which extractor the supercritical state was created). The ethanol was placed in the extractor in an amount that allowed the electrode to be dipped just full (about 3.5 litters), and the supercritical state was created in it.

Otherwise, an electric double-layer capacitor sample of Example 6 was prepared in the same manner as in the preparation of the electric double-layer capacitor of Example 1.

As can be seen from Table 1 given later, the amount of NMP remaining in the electrode (the coating film) was 80 ppm; the electrostatic capacity of each electrode per volume was 20.0 (F/cm$^3$); and the initial charge/discharge efficiency η was 19.4%.

EXAMPLE 7

The supercritical carbon dioxide treatment carried out in Example 1 was modified as follows.

The post-rolling electrode was dipped in methylene chloride. Just after it was lifted up from the methylene chloride, the supercritical carbon dioxide treatment was applied to it. Already at the time of the supercritical carbon dioxide treatment, ethanol would have coexisted. Then, the electrode already subjected to the supercritical carbon dioxide treatment was vacuum dried at 145° C. for 15 hours (the second drying step).

Otherwise, an electric double-layer capacitor sample of Example 7 was prepared in the same manner as in the preparation of the electric double-layer capacitor of Example 1.

As can be seen from Table 1 given later, the amount of NMP remaining in the electrode (the coating film) was 100 ppm; the electrostatic capacity of each electrode per volume was 19.5 (F/cm$^3$); and the initial charge/discharge efficiency η was 19.3%.

EXAMPLE 8

The supercritical carbon dioxide treatment carried out in Example 1 was modified as follows.

The supercritical carbon dioxide treatment was applied to the post-rolling electrode while dipped in methylene chloride. More specifically, the electrode and methylene chloride were placed in an extractor of a supercritical system (in which extractor the supercritical state was created). The methylene chloride was placed in the extractor in an amount that allowed the electrode to be dipped just full (about 3.5 litters), and the supercritical state was created in it.

Otherwise, an electric double-layer capacitor sample of Example 8 was prepared in the same manner as in the preparation of the electric double-layer capacitor of Example 1.

As can be seen from Table 1 given later, the amount of NMP remaining in the electrode (the coating film) was 40 ppm; the electrostatic capacity of each electrode per volume was 21.0 (F/cm$^3$); and the initial charge/discharge efficiency η was 19.8%.

COMPARATIVE EXAMPLE 1

The supercritical carbon dioxide treatment done in Example 1 was omitted. Instead, the electrode was vacuum dried at 175° C. for 30 hours. Otherwise, an electric double-layer capacitor sample of Comparative Example 1 was prepared in the same manner as in the preparation of the electric double-layer capacitor of Example 1.

As can be seen from Table 1 given later, the amount of NMP remaining in the electrode (the coating film) was 3,000 ppm; the electrostatic capacity of each electrode per volume was 18.1 (F/cm$^3$); and the initial charge/discharge efficiency η was 16.8%.

COMPARATIVE EXAMPLE 2

In Example 1, the post-rolling electrode was dipped in acetone for 10 minutes. Thereafter, the electrode was dried 145° C. for 15 hours; no supercritical carbon dioxide treatment was applied to it. Otherwise, an electric double-layer capacitor sample of Comparative Example 2 was prepared in the same manner as in the preparation of the electric double-layer capacitor of Example 1.

As can be seen from Table 1 given later, the amount of NMP remaining in the electrode (the coating film) was 1,000 ppm; the electrostatic capacity of each electrode per volume was 18.2 (F/cm$^3$); and the initial charge/discharge efficiency η was 18.0%.

TABLE 1

| Sample No. | Amount of NMP Remaining in Electrode (ppm) | Electrostatic Capacity of Electrode per Volume (F/cm$^3$) | Initial Charge/Discharge Efficiency η(%) |
| --- | --- | --- | --- |
| Ex. 1 | 330 | 18.7 | 18.4 |
| Ex. 2 | 130 | 18.9 | 19.1 |
| Ex. 3 | 110 | 19.1 | 19.3 |
| Ex. 4 | 71 | 20.2 | 19.5 |
| Ex. 5 | 120 | 19.0 | 19.2 |
| Ex. 6 | 80 | 20.0 | 19.4 |
| Ex. 7 | 100 | 19.5 | 19.3 |
| Ex. 8 | 40 | 21.0 | 19.8 |
| Comp. Ex. 1 | 3,000 | 18.1 | 16.8 |
| Comp. Ex. 2 | 1,000 | 18.2 | 18.0 |

NMP: N-methyl-2-pyrrolidinone

The above results of experimentation are proof of the advantages of the present invention.

According to the present invention, when the electrode for electrochemical devices is fabricated, the treating method for removing off a binder solvent adsorbed to pores in an electrode-constituting activated charcoal or the like, using carbon dioxide in a supercritical state, is used or a method wherein the supercritical-state treating method is modified using a low-boiling solvent is used, whereby the electrostatic capacity of the carbonaceous material as the active substance and the reliability of the electrochemical device can be improved.

We claim:

1. A process for fabricating an electrode for electrochemical devices, said electrode comprising an active substance and a binder on a support carrier, the process comprising:
providing an electrode-formation coating material comprising said active substance, said binder and a binder solvent,
coating said coating material on said support carrier to form a coating film for said electrode, and then
removing the binder solvent remaining in said coating film by treating with carbon dioxide ($CO_2$) in a supercritical state without using a low-boiling solvent, wherein the low-boiling solvent has a boiling point from 30 to 180° C.

2. A process for fabricating an electrode for electrochemical devices, said electrode comprising an active substance and a binder on a support carrier, the process comprising:
providing an electrode-formation coating material comprising said active substance, said binder and a binder solvent,
coating said coating material on said support carrier to form a coating film for said electrode, and then
treating said coating film with carbon dioxide ($CO_2$) in a supercritical state while a low-boiling solvent remains deposited to said coating film, thereby removing the binder solvent remaining in said coating film,
wherein the low-boiling solvent (i) has a boiling point from 30 to 180° C., (ii) is compatible with the binder solvent, and (iii) has the boiling point lower than that of the binder solvent.

3. The process for fabricating an electrode for electrochemical devices according to claim 2, wherein said coating film has been dipped in said low-boiling solvent, said coating film is lifted up therefrom while said low-boiling solvent remains deposited to said coating film, after which said coating film is treated with carbon dioxide in a supercritical state.

4. A process for fabricating an electrode for electrochemical devices, said electrode comprising an active substance and a binder on a support carrier, the process comprising:
providing an electrode-formation coating material comprising said active substance, said binder and a binder solvent,
coating said coating material on said support carrier to form a coating film for said electrode, and then
dipping the coating film in a low-boiling solvent and treating said coating film with carbon dioxide ($CO_2$) in a supercritical state while said coating film remains dipped in the low-boiling solvent, thereby removing the binder solvent remaining in said coating film,
wherein the low-boiling solvent (i) has a boiling point from 30 to 180° C., (ii) is compatible with the binder solvent, and (iii) has the boiling point lower than that of the binder solvent.

5. The process for fabricating an electrode for electrochemical devices according to claim 1, wherein said active substance is a carbonaceous material having a specific surface area of 30 m$^2$/g or greater.

6. The process for fabricating an electrode for electrochemical devices according to claim 2, wherein said active substance is a carbonaceous material having a specific surface area of 30 m$^2$/g or greater.

7. The process for fabricating an electrode for electrochemical devices according to claim 4, wherein said active substance is a carbonaceous material having a specific surface area of 30 m$^2$/g or greater.

8. The process for fabricating an electrode for electrochemical devices according to claim 5, wherein said carbonaceous substance is an activated charcoal.

9. The process for fabricating an electrode for electrochemical devices according to claim 6, wherein said carbonaceous substance is an activated charcoal.

10. The process for fabricating an electrode for electrochemical devices according to claim 7, wherein said carbonaceous substance is an activated charcoal.

11. The process for fabricating an electrode for electrochemical devices according to claim 1, wherein said electrode for electrochemical devices is an electrode for electric double-layer capacitors, an electrode for lithium ion secondary batteries, or an electrode for hybrid capacitors.

12. The process for fabricating an electrode for electrochemical devices according to claim 2, wherein said electrode for electrochemical devices is an electrode for electric double-layer capacitors, an electrode for lithium ion secondary batteries, or an electrode for hybrid capacitors.

13. The process for fabricating an electrode for electrochemical devices according to claim 4, wherein said electrode for electrochemical devices is an electrode for electric double-layer capacitors, an electrode for lithium ion secondary batteries, or an electrode for hybrid capacitors.

14. An electrochemical device fabrication process, wherein:
an electrode for electrochemical devices, comprising an active substance and a binder on a support carrier, is fabricated by a process for fabricating an electrode for electrochemical devices comprising:
providing an electrode-formation coating material comprising said active substance, said binder and a binder solvent,
coating said coating material on said support carrier to form a coating film for said electrode, and then
removing the binder solvent remaining in said coating film by treating with carbon dioxide ($CO_2$) in a supercritical state without using a low-boiling solvent, wherein the low-boiling solvent has a boiling point from 30 to 180° C., and thereafter,
assembling the fabricated electrode for electrochemical devices, a separator, an electrolyte and a housing into the electrochemical device.

15. An electrochemical device fabrication process, wherein:
an electrode for electrochemical devices, comprising an active substance and a binder on a support carrier, is fabricated by a process for fabricating an electrode for electrochemical devices comprising:
providing an electrode-formation coating material comprising said active substance, said binder and a binder solvent,
coating said coating material on said support carrier to form a coating film for said electrode, and then
treating said coating film with carbon dioxide ($CO_2$) in a supercritical state while a low-boiling solvent remains deposited to said coating film, thereby removing the binder solvent remaining in said coating film,
wherein the low-boiling solvent (i) has a boiling point from 30 to 180° C., (ii) is compatible with the binder solvent, and (iii) has the boiling point lower than that of the binder solvent, and thereafter,
assembling the fabricated electrode for electrochemical devices, a separator, an electrolyte and a housing into the electrochemical device.

16. An electrochemical device fabrication process, wherein:
an electrode for electrochemical devices, comprising an active substance and a binder on a support carrier, is fabricated by a process for fabricating an electrode for electrochemical devices comprising:
providing an electrode-formation coating material comprising said active substance, said binder and a binder solvent,
coating said coating material on said support carrier to form a coating film for said electrode, and then
dipping the coating film in a low-boiling solvent and treating said coating film with carbon dioxide ($CO_2$) in a supercritical state while said coating film remains dipped in the low-boiling solvent, thereby removing the binder solvent remaining in said coating film,
wherein the low-boiling solvent (i) has a boiling point from 30 to 180° C., (ii) is compatible with the binder solvent, and (iii) has the boiling point lower than that of the binder solvent, and thereafter,
assembling the fabricated electrode for electrochemical devices, a separator, an electrolyte and a housing into the electrochemical device.

17. The process according to claim 15, wherein said coating film has been dipped in said low-boiling solvent, said coating film is lifted up therefrom while said low-boiling solvent remains deposited to said coating film, after which said coating film is treated with carbon dioxide in a supercritical state.

18. The process according to claim 1, wherein a content of the binder solvent that remains in the coating film after the removing is 500 ppm or less.

19. The process according to claim 14, wherein the electrolyte is selected from the group consisting of triethylmethylammonium borofluoride ($TEMA.BF_4$) and tetraethylammonium borofluoride ($TEA.BF_4$) dissolved in a solvent or a polymer electrolyte.

20. The process according to claim 1, wherein when N-methyl-2-pyrrolidinone is used as the binder solvent, and the low-boiling solvent is acetone, methylene chloride, or an alcohol.

* * * * *